US009950261B2

(12) United States Patent
Bauchot et al.

(10) Patent No.: US 9,950,261 B2
(45) Date of Patent: Apr. 24, 2018

(54) SECURE DATA ENCODING FOR LOW-RESOURCE REMOTE SYSTEMS

(71) Applicant: International Business Machines Corporation, Armonk, NY (US)

(72) Inventors: Frederic J. Bauchot, Saint-Jeannet (FR); Graham Butler, Thatcham (GB)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 15/141,859

(22) Filed: Apr. 29, 2016

(65) Prior Publication Data

US 2017/0312633 A1     Nov. 2, 2017

(51) Int. Cl.
*A63F 13/60* (2014.01)
*G06F 17/30* (2006.01)
*A63F 3/02* (2006.01)

(52) U.S. Cl.
CPC .............. *A63F 13/60* (2014.09); *A63F 3/02* (2013.01); *G06F 17/30946* (2013.01)

(58) Field of Classification Search
CPC ....... A63F 13/60; A63F 3/02; G06F 17/30946
See application file for complete search history.

(56) References Cited

U.S. PATENT DOCUMENTS

| 4,555,805 | A | 11/1985 | Talbot |
| 4,602,283 | A | 7/1986 | Corgnier et al. |
| 6,014,733 | A | 1/2000 | Bennett |
| 6,737,994 | B2 | 5/2004 | Davis et al. |
| 6,826,111 | B2 | 11/2004 | Schneider et al. |

(Continued)

FOREIGN PATENT DOCUMENTS

| CN | 103023653 A | 4/2013 |
| CN | 102025482 B | 2/2014 |

(Continued)

OTHER PUBLICATIONS

Bauchot et al., "Pad Encoding and Decoding", U.S. Appl. No. 14/947,068, filed Nov. 20, 2015, 52 pages.

(Continued)

*Primary Examiner* — James S McClellan
*Assistant Examiner* — Kevin Carter
(74) *Attorney, Agent, or Firm* — Steven L. Fisher-Stawinski

(57) ABSTRACT

A method includes identifying a string and parameters. The parameters include a coding frame, elements, and a travel path. The method includes traversing the travel path to yield an output artifact. Responsive to no active element at a next position, the method includes filling the next position from the front of the string and advancing one character and one position. Responsive to an element at the next position, the method includes filling the next position from the end of the string, decrementing one character, and determining an attack position. Responsive to the attack position existing, the method includes setting the next position to the attack position. Responsive to no attack position existing, the method includes advancing the next position according to the travel path. The method results in the output artifact encoding the string. A corresponding method decodes the output artifact. Corresponding computer program products and computer systems are disclosed.

20 Claims, 7 Drawing Sheets

(56) References Cited

U.S. PATENT DOCUMENTS

| | | | |
|---|---|---|---|
| 6,876,774 | B2 | 4/2005 | Satoh et al. |
| 7,327,293 | B2 | 2/2008 | Foster |
| 8,311,222 | B2 | 11/2012 | Rawson, Sr. |
| 8,340,162 | B2 | 12/2012 | Tzannes |
| 8,467,533 | B2 | 6/2013 | Hammersmith |
| 8,670,560 | B2 | 3/2014 | Cheddad et al. |
| 8,687,810 | B2 | 4/2014 | Bukshpun et al. |
| 9,015,494 | B2 | 4/2015 | Fischer |
| 9,350,382 | B1 | 5/2016 | Bauchot et al. |
| 9,425,825 | B2 | 8/2016 | Bauchot et al. |
| 9,473,167 | B2 | 10/2016 | Bauchot et al. |
| 9,577,670 | B2 | 2/2017 | Bauchot et al. |
| 9,647,681 | B2 | 5/2017 | Bauchot et al. |
| 9,667,271 | B2 | 5/2017 | Bauchot et al. |
| 2003/0118186 | A1 | 6/2003 | Gilley |
| 2006/0246403 | A1* | 11/2006 | Monpouet ........... A63F 3/00643 434/128 |
| 2007/0018391 | A1* | 1/2007 | Ishihara ................ A63F 3/00 273/255 |
| 2009/0063431 | A1 | 3/2009 | Erol et al. |
| 2009/0100048 | A1 | 4/2009 | Hull et al. |
| 2010/0281256 | A1 | 11/2010 | Farrugia et al. |
| 2012/0011360 | A1 | 1/2012 | Engels et al. |
| 2012/0082310 | A1 | 4/2012 | Rashkovskiy et al. |
| 2013/0232305 | A1 | 9/2013 | Cuthbert, II et al. |
| 2014/0105382 | A1 | 4/2014 | Liu |
| 2014/0151960 | A1* | 6/2014 | Caffrey ................ A63F 13/213 273/237 |
| 2015/0092834 | A1 | 4/2015 | Cote et al. |
| 2015/0331720 | A1* | 11/2015 | Huetter ................ G06F 9/544 718/104 |
| 2016/0179859 | A1 | 6/2016 | Bauchot et al. |
| 2016/0182085 | A1 | 6/2016 | Bauchot et al. |
| 2016/0218736 | A1 | 7/2016 | Bauchot et al. |
| 2016/0294412 | A1 | 10/2016 | Bauchot et al. |
| 2016/0365872 | A1 | 12/2016 | Bauchot et al. |
| 2017/0077948 | A1 | 3/2017 | Bauchot et al. |
| 2017/0149442 | A1 | 5/2017 | Bauchot et al. |
| 2017/0170843 | A1 | 6/2017 | Bauchot et al. |

FOREIGN PATENT DOCUMENTS

| | | |
|---|---|---|
| CN | 103684742 A | 3/2014 |
| EP | 0089632 A1 | 9/1983 |
| EP | 0304217 A2 | 2/1989 |
| EP | 0445290 B1 | 3/1997 |
| GB | 1295572 | 11/1972 |
| WO | 2010046104 A2 | 4/2010 |
| WO | 2014082090 A1 | 5/2014 |

OTHER PUBLICATIONS

Bauchot et al., "Path Encoding and Decoding", U.S. Appl. No. 14/947,101, filed Nov. 20, 2015, 48 pages.
Bauchot et al., "Wall Encoding and Decoding", U.S. Appl. No. 14/947,123, filed Nov. 20, 2015, 48 pages.
Bhattasali, Tapalina, "LICRYPT: Lightweight Cryptography Technique for Securing Smart Objects in Internet of Things Environment," CSI Communications, May 2013, 3 pages.
Desoky et al., "Chestega: chess steganography methodology", Security and Communication Networks, 2009, 2:555-566, Published online Mar. 6, 2009 in Wiley InterScience, DOI: 10.1002/sec.99, Copyright © 2009 John Wiley & Sons, Ltd.
Glaser et al., "CipherChess", Dec. 5, 2001, 26 pages, captured on Dec. 11, 2015, <www.cs.virginia.edu/evans/cs588-fall2001/projects/reports/team2.pdf>.
Ritchey et al., "Covert Channels in Combinatorial Games" DISIO Workshop, Mar. 19-23, 2012, Desenzano del Garda, Italy, 8 pages, captured Dec. 11, 2015, Copyright © 2012 ICST 978-1-936968-47-3, DOI 10.4108/icst.simutools.2012.247733.
"Cryptography: One time Pad, Information Theoretical Security, and Stream Ciphers," Computer Security CS 426 Lecture 3, Fall 2010, 19 pages, CS426, <https://www.cs.purdue.edu/homes/ninghui/courses/426_Fall10/handouts/426_Fall10>.
Great Britain Intellectual Property Office, Search Report under Section 17(5), for Application No. GB1422719.3, completed Jul. 3, 2015, 3 pages.
Great Britain Intellectual Property Office, Search Report under Section 17(5), for Application No. GB1422717.7, completed Jul. 3, 2015, 3 pages.
Great Britain Intellectual Property Office, Search Report under Section 17(5), for Application No. GB1422714.4, completed Jun. 19, 2015, 4 pages.
"One-time pad", from Wikipedia, the free encyclopedia, 6 pages, printed on Dec. 15, 2015, <https://en.wikipedia.org/wiki/One-time_pad>.
"Sinc filter", from Wikipedia, the free encyclopedia, 2 pages, printed on Dec. 15, 2015, <https://en.wikipedia.org/wiki/Sinc_filter>.
"Stream Ciphers," Cryptosmith, Jun. 7, 2007, Security, Tech Teaching, 2 pages, <http://cryptosmith.com/2007/06/07/stream-ciphers/>.
Vučković, V., "An Alternative Efficient Chessboard Representation Based on 4-Bit Piece Coding," Yugoslav Journal of Operations Researcn, 22, No. 1, 2012, pp. 265-284. DOI: 10.2298/YJOR081028011V.
Lange, B., "Steganography using the Chess PGN Standard Format," Global Information Assurance Certification Paper, Technical report, SANS Institute, 2004, 37 pages.
Bauchot et al., "Secure Data Encoding for Low-Resource Remote Systems," U.S. Appl. No. 15/663,338, filed Jul. 28, 2017.
Bauchot et al., "Secure Data Encoding for Low-Resource Remote Systems," U.S. Appl. No. 15/663,386, filed Jul. 28, 2017.
List of IBM Patents or Patent Applications Treated as Related, Signed Jul. 28, 2017, 2 pages.
Shields, W., "Programming Puzzles, Chess Positions and Huffman Coding," http://www.cforcoding.com/2009/12/programming-puzzles-chess-positions-and.html, Dec. 7, 2009, (accessed Nov. 10, 2017), 8 pages.
"Programmer Puzzle: Encoding a chess board state throughout a game," Stack Overflow, https://stackoverflow.com/questions/1831386/programmer-puzzle-encoding-a-chess-board-state-throughout-a-game (accessed Nov. 10, 2017), 52 pages.

* cited by examiner

SECURE DATA ENCODING FOR LOW-RESOURCE REMOTE SYSTEMS

BACKGROUND

The present invention relates generally to the field of secure data transmission, and more particularly to data encoding for use in low-resource embedded systems such as Internet-of-Things ("IoT") devices.

IoT introduces a wide range of embedded devices that have varying levels of computing and power resources. Conventional strong cryptography methods are often resource intensive and may provide an unnecessary degree security for many IoT applications. Low-resource encodings that require minimal additional memory and processing power can provide a measure of security where strong cryptography is impractical.

SUMMARY

In one aspect, a computer-implemented method includes identifying an input string and a set of shared parameters. The input string includes one or more ordered characters. The set of shared parameters includes (i) a coding frame including a plurality of spatially related positions with each of the plurality of spatially related positions being fillable by any of the one or more ordered characters; (ii) one or more positioned elements, each having defined therefor a location position and one or more attack positions, the location position and each of the one or more attack positions being of the plurality of spatially related positions, and the one or more attack positions being in a specified order; (iii) a travel path including an order for traversing the plurality of spatially related positions; and (iv) an initial position, which is that of the plurality of spatially related positions that is first in the travel path. The computer-implemented method further includes initializing a head index to a first character of the one or more ordered characters, initializing a tail index to a last character of the one or more ordered characters, and traversing the travel path to yield an output artefact by, for each next position of the plurality of spatially related positions, beginning with the initial position: (i) determining whether the next position includes the location position for any active element of the one or more positioned elements; (ii) responsive to no active element having the location position at the next position: (a) filling the next position in the output artefact with that of the one or more ordered characters that is identified by the head index; (b) incrementing the head index forward by one character of the one or more ordered characters; (c) responsive to the head index being equal to the tail index, terminating; and (d) advancing the next position according to the travel path; and (iii) responsive to the active element having the location position at the next position: (a) filling the next position in the output artefact with that of the one or more ordered characters that is identified by the tail index; (b) decrementing the tail index backward by one character of the one or more ordered characters; (c) responsive to the head index being equal to the tail index, terminating; (d) determining, for the active element, an active attack position by selecting from the one or more attack positions, based on the specified order and on whether each of the one or more attack positions is valid; (e) responsive to the active attack position existing for the active element, setting the next position to the active attack position; and (f) responsive to no active attack position existing for the active element, advancing the next position according to the travel path. The result of the computer-implemented method is that the output artefact includes an encoding of the input string.

A corresponding computer-implemented method may be applied to decode the output artefact back into the input string. Corresponding computer program products and computer systems are also disclosed.

DETAILED DESCRIPTION

Figure 1:
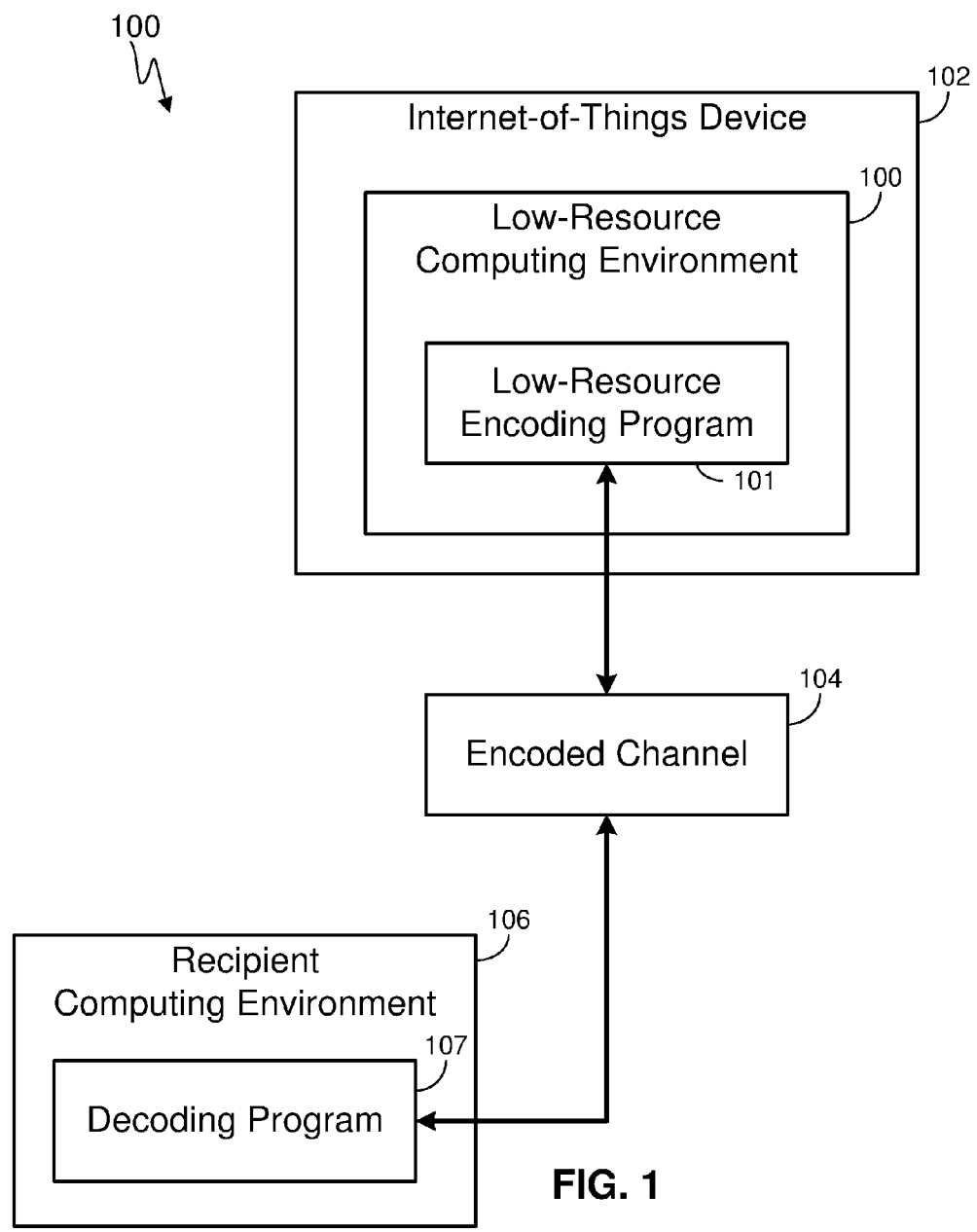
FIG. 1 is a block diagram illustrating an operating environment, in accordance with at least one embodiment of the present invention.

FIG. 1 is a block diagram illustrating an operating environment, generally designated low-resource computing environment 100, in accordance with at least one embodiment of the present invention. In the low-resource computing environment 100 and IoT Device 102 may provide a low-resource computing environment 100. The low resource computing environment 100 may communicate with a recipient computing environment 106 via an encoded channel 104. Both the low-resource computing environment 100 and the recipient computing environment 106 may be general purpose computers, such as that depicted in FIG. 7. The low-resource computing environment 100 may host a low-resource encoding program 101, and the recipient computing environment may host a decoding program 107.

In various embodiments, the IoT device 102 is an embedded device that operates within a distributed environment to form or communicate with a computing service. The recipient computing environment 106 may be a physical or virtual server, another IoT device, or any other physical, virtual, or logical system to which the IoT device would send an encoded message. Similarly, in various embodiments, the low-resource encoding program 101 may operate on a source computing environment (not necessarily subject to resource restrictions) that would send encoded messages to an IoT device in the role of the recipient computing environment 106 (which may be subject to low resource restrictions).

Often, whether sending or receiving applications running on IoT devices only need a low level of encoding. For instance, field sensors and actuators transmit and receive data that is not highly sensitive, but still should not be transmitted in the clear. Specifically, an attacker may be able to listen to a signal in the clear from a field sensor and construct systems that react in unexpected ways or inject false data into the signal. Such devices may benefit from a system which presents a good trade-off between a measure of data security on the one hand and reduced power consumption, memory usage, and processor time on the other.

Accordingly, in various embodiments, the encoded channel 104 may be a direct or indirect, wireless or wired link between the IoT device 102 and the recipient computing environment 106. The encoded channel 104 may be layered on top of a communications protocol, such as TCP/IP and carried over a private or public data network including the Internet, mobile data networks, local Wi-Fi networks, etc.

Figure 3:
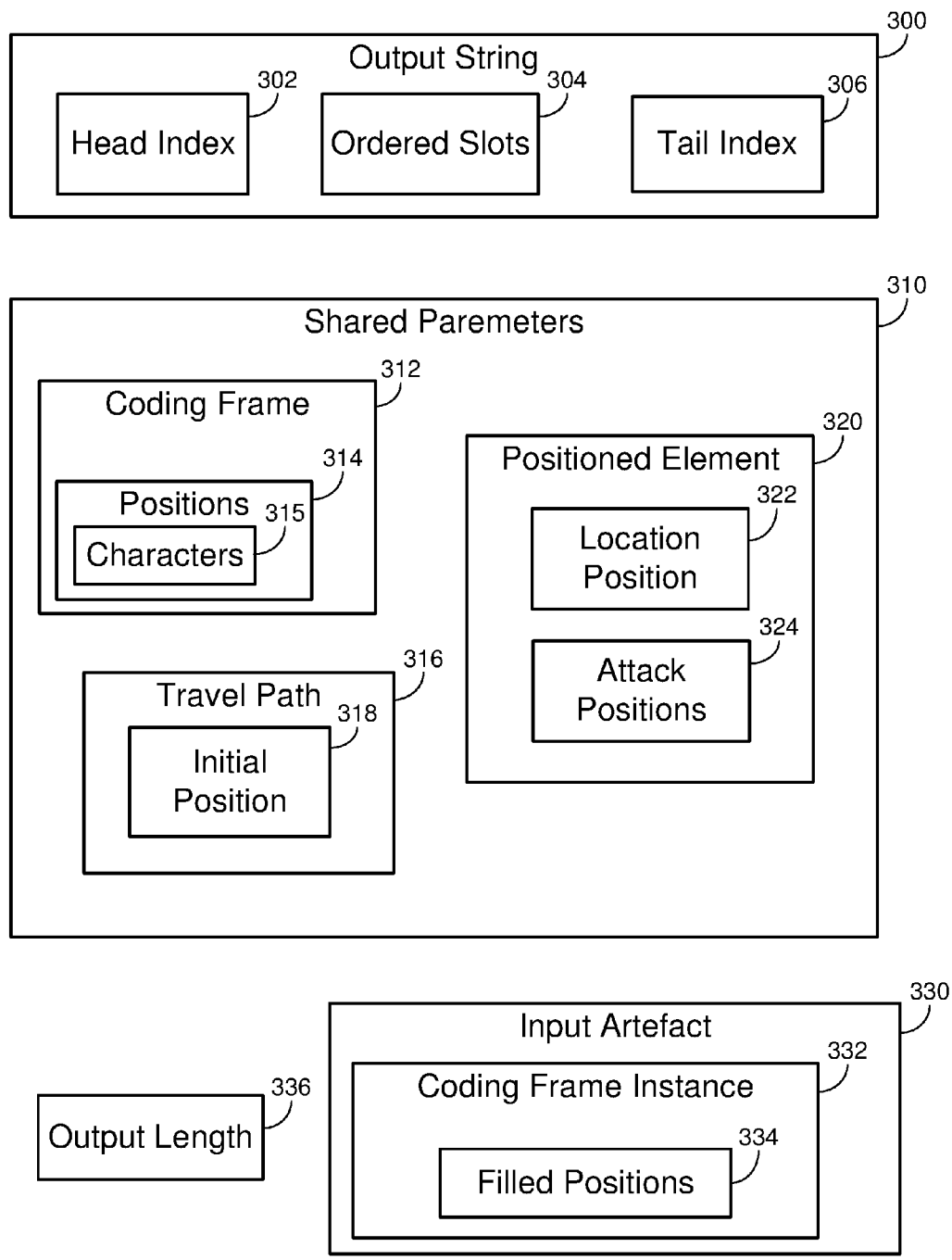
FIG. 3 is a block diagram depicting various data elements operated upon by a decoding program, in accordance with at least one embodiment of the present invention.
Figure 4A:
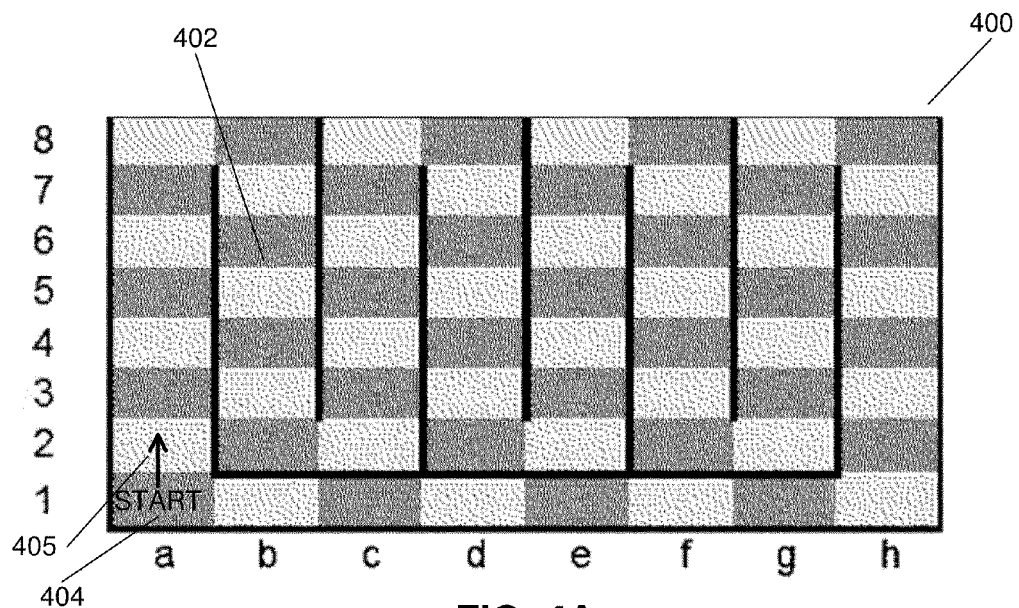
FIG. 4A depicts a representation of a chess board coding frame with a travel path, in accordance with at least one embodiment of the present invention.
Figure 4B:
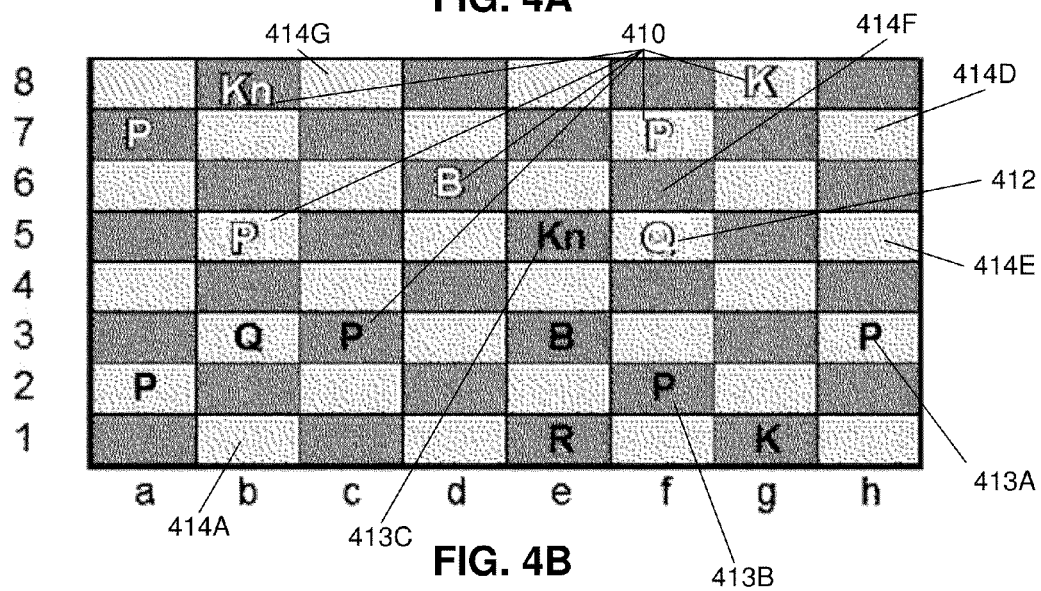
FIG. 4B depicts a representation of a chess board coding frame with positioned elements represented as chess pieces, in accordance with at least one embodiment of the present invention.

Encoding according to various embodiments of the present invention may proceed with reference to a chess board, such as the example depicted in FIGS. 4A and 4B. More specifically, however, FIG. 2 displays a block diagram of various logical data elements operated upon by the low-resource encoding program 101. Similarly, FIG. 3 displays a block diagram of various logical data elements operated upon by the decoding program 107.

Figure 2:
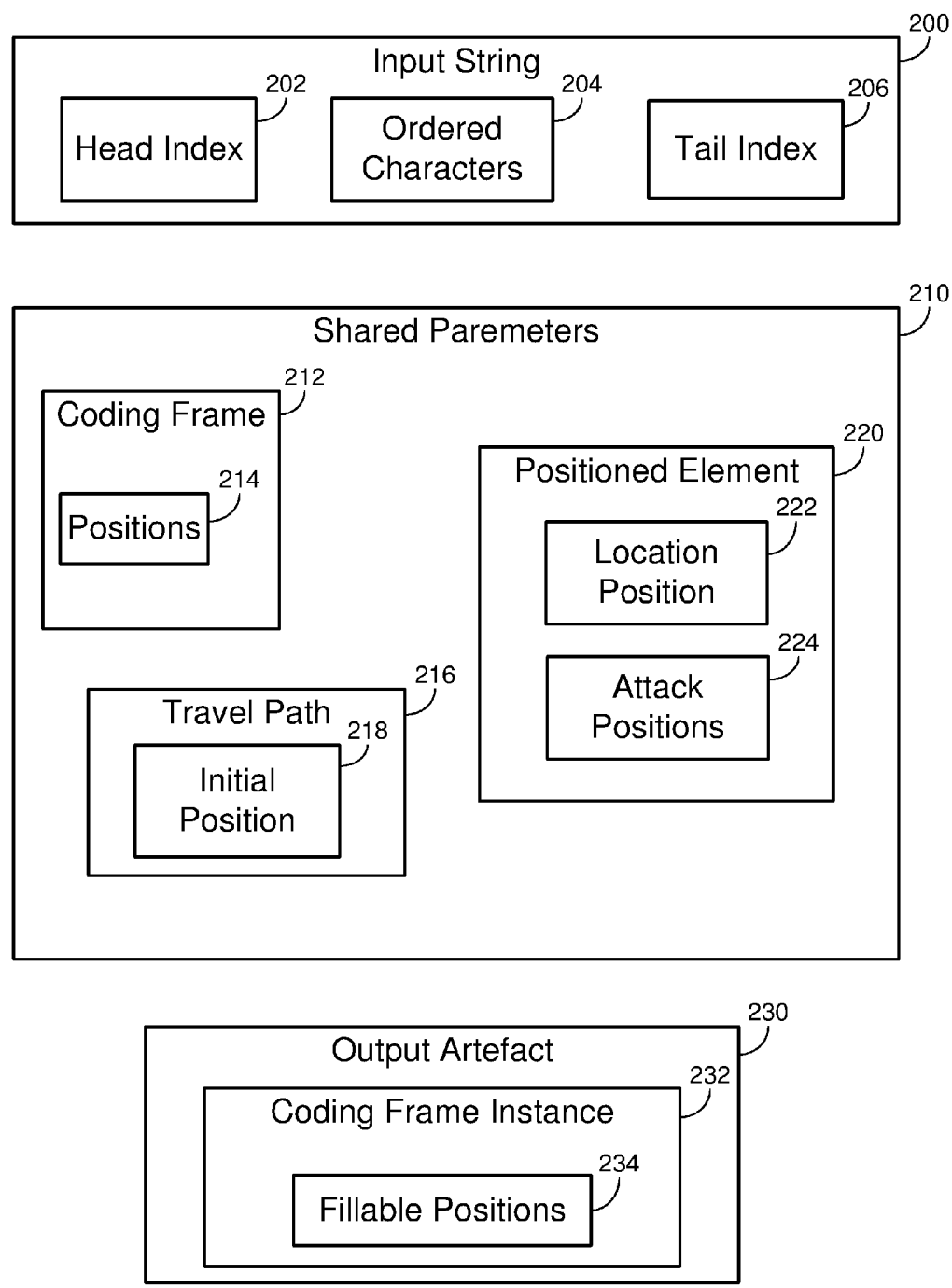
FIG. 2 is a block diagram depicting various data elements operated upon by a low-resource encoding program, in accordance with at least one embodiment of the present invention.

Referring now to FIG. 2, the low-resource encoding program may encode an input string 200. The input string 200 may include one or more ordered characters 204. The ordered characters may belong to any set of human or machine language characters, including binary, decimal, or hexadecimal digits, as well as human-readable text in any language represented using any standard or non-standard text encoding. Examples of possible standard text encodings include ASCII, UTF-8, UTF-16, UTF-32, Big5, Guobiao, ISO 8859, JIS X, etc. For the input string 200, the low-resource encoding program 101 may define a head index 202 and a tail index 206, which may be initialized to the beginning and end of the input string 200, respectively. In alternative embodiments, more or fewer indices may be applied to the input string 200, and the starting positions of such indices may be other than the beginning and end of the input string 200.

Referring now to FIG. 3, the decoding program 107 may decode an output string 300 to retrieve the input string 200. The output string 300 may include a plurality of ordered empty slots 304 into which characters of the same character set of the input string 200 may be placed by the decoding program 107. The plurality of ordered empty slots 304 may be equal in number to the output string length 336. For the output string 300, the decoding program 107 may define a head index 302 and a tail index 306, which may be initialized to the beginning and end of the output string 300, respectively. In alternative embodiments, more or fewer indices may be applied to the output string 300, and the starting positions of such indices may be other than the beginning and end of the output string 300. In various embodiments, the decoding program 107 may operate using the output string length 336, which may be predetermined or transmitted to the recipient computing environment 106.

Referring now to FIG. 2, the low-resource encoding program 101 may operate using a set of shared parameters 210. The shared parameters 210 may include a coding frame 212, which is includes a plurality of spatially related positions 214. In general, the coding frame 212 may be of any shape in any number of logically defined spatial dimensions, with the spatially related positions 214 being defined within the coding frame 212 as having a location with respect to other positions 214 or with respect to an absolute measure, such as a coordinate system. For example, the coding frame 212 may include a chess board 400 as in FIGS. 4A and 4B. In such embodiments, the coding frame 212 may include a planar grid eight positions by eight positions in size, for sixty-four total positions, as in chess. Alternative embodiments include: planar grids of different sizes, including non-square and non-rectangular grids; frames having other than four neighbors per location, such as six neighbors per location (hexagons) and three neighbors per location (equilateral triangles); and frames in more than two dimensions, such as a three dimensional eight position by eight position by eight position chess board with five hundred twelve positions.

Referring still to FIG. 2, each of the plurality of spatially related positions 214 may be fillable by any of the one or more ordered characters 204. That is, the low-resource encoding program 101 may copy, move, transmit, and insert, etc. characters 204 from the input string 200 into positions 214 of the coding frame 212. The low-resource encoding program may create an output artefact 230, which may be an object, multidimensional array, list, or other data structure that represents a filled instance of the coding frame 212, i.e., a coding frame instance 232. The coding frame instance 232 may be understood to include one or more fillable positions 234, which correspond to the positions 214 and, when filled, carry the encoded data. The output artefact 230 may be understood as including an encoding of the input string 200. Thus, the low-resource encoding program 101 may transmit the output artefact 230 to a recipient, such as the recipient computing environment 106. Transmission may occur over the encoded channel 104, as described above.

The set of shared parameters 210 may further include a travel path 216. The travel path 216 may include an order for traversing the plurality of spatially related positions 214. Any order of traversal is contemplated for various embodiments, including orders that do not include every position 214, include some positions 214 twice or multiple times, and orders that have cycles, branches, or other structures. An initial position 218 may be identified as that of the plurality of spatially related positions 214 that is first in the travel path 216. FIG. 4A provides an example of the travel path 216 in the context of the chess board 400 as the coding frame 212. In FIG. 4A, the chess board travel path 402 is represented as the squares running between the darkened lines, as shown. The darkened lines restrict the chess travel path 402 to a single cycle of all squares of the chess board 400, which could be traversed in or two directions. It should be understood that various embodiments contemplate the travel path as the spatially related positions 214 as arranged in one dimension, however this does not change the arrangement of the positions 214 within the coding frame 212 in any number of dimensions.

Referring still to the example of FIG. 4A, a starting square 404 (in this example, A1) may be the initial position 218. An initial direction 405 may further specify the direction of traverse for the chess travel path 402. Thus, the travel path 216 is fully specified with the chess board 400.

Referring now to FIG. 2, the set of shared parameters 210 may further include one or more positioned elements 220. Each of the one or more positioned elements 220 may have defined therefor a location position 222 and one or more attack positions 224. The location position 222 and one or more attack positions 224 may be positions of the plurality of spatially related positions 214. The one or more attack positions 224 for a particular positioned element may be defined in a specified order. The one or more positioned elements 220 and the one or more attack positions 224 may be defined in accordance with a variant of chess.

FIG. 4B depicts an example. In the depicted example, placed on the chess board 400 is a plurality of chess pieces 410. Each chess piece 410 is defined in accordance with standard chess, and accordingly is given a color (i.e., white or black) and a name (i.e., pawn, knight, bishop, rook, king, or queen). Each chess piece 410 is defined to be at a given position (location position 222) as part of the set of shared parameters 210. In the depicted embodiment of the invention, the chess pieces 410 (i.e., positioned elements 220) have defined attack positions 224.

For example, the white queen 412 at F5 has certain moves available to it in standard chess, if white's move. Specifically, the white queen 412 may move: (i) up file F at most one square to F6 414D, where it can go no further because it can neither collocate with nor pass through the white pawn at F7; (ii) diagonally up and right at most two squares to H7 414D, where it can go no further because it has reached the edge of the chess board 400; (iii) right along rank 5 at most two squares to H5 414E, where it can go no further because it has reached the edge of the chess board 400; (iv) diagonally down and right up to two squares to H3, where it would capture the black pawn 413A and must stop; (v) down along rank F at most three squares to F2, where it would capture the black pawn 413B and must stop; (vi) diagonally down and left up to four squares to B1 414A, where it can go no further because it has reached the edge of the chess board 400; (vii) left along rank 5 at most one square to E5, where it would capture the black knight 413C and must stop; and (viii) diagonally up and left at most three squares to C8 414G, where it can go no further because it has reached the edge of the board. Of these possible attack positions, the set of shared parameters 210 may include an ordered preference for attacks, if valid. For example, the white queen 412 may have defined the preference: attack down the file as far as possible; if there is no valid attack down the file, attack diagonally down and left as far as possible; if there is no valid attack down and left, attack right along the rank exactly three squares; if it is not valid to attack right along the rank exactly three squares, attack diagonally up and left one square; etc.

In some embodiments, the low-resource encoding program 101 may derive the potential attack positions based on the names and colors of the positioned elements 220 and the rules of chess or a variant of chess (in the claims, "a variant of chess" includes standard chess). In such embodiments, the names and colors of the pieces 410 (i.e., black pawn, white rook) may be specified, and it is possible to determine where the pieces may attack. In alternative embodiments, it is not necessary to specify the names and colors of the positioned elements 220, but only their arbitrarily defined valid attack positions 224 and preference order among the attack positions 224. It should be noted that various embodiments of the invention do not represent actual movement of the positioned elements 220, but rather rely on where the positioned elements 220 may validly move and/or attack, as described below.

Referring now to FIG. 3, the decoding program 107 operates on data elements broadly similarly to those of the low-resource encoding program 101. The decoding program 107 receives the input artefact 330, which includes the coding frame instance 332, which has filled positions 334, suitable for decoding. Each filled position 334 is fillable by a content character selected from the set of characters. In addition, embodiments of the decoding program 107 may operate on the specified output length 336, which corresponds to the length of the decoded output string 300. The output length 336 may be set in advance as a property of the system in which the decoding program 107 operates, or the output length 336 may be transmitted with the input artefact 330 as additional input.

Similarly with the shared parameters 210 of the low-resource encoding program 101, the decoding program 107 operates on shared parameters 310. The shared parameters 310 include a coding frame 312, including spatially related positions 314, defined similarly to the coding frame 212 and spatially related positions 214. Distinctly, the spatially related positions 314 generally come pre-filled with characters 315 upon which the decoding program 107 operates. A travel path 316 and an initial position 318 are defined for the spatially related positions 314 in a manner similar to the travel path 216 and initial position 218. The shared parameters 310 for the decoding program 107 may further include one or more positioned elements 320, each having defined therefor a location position 322 and one or more attack positions 324 in a specified preferential order, similarly to the corresponding shared parameters 210.

Figure 5:
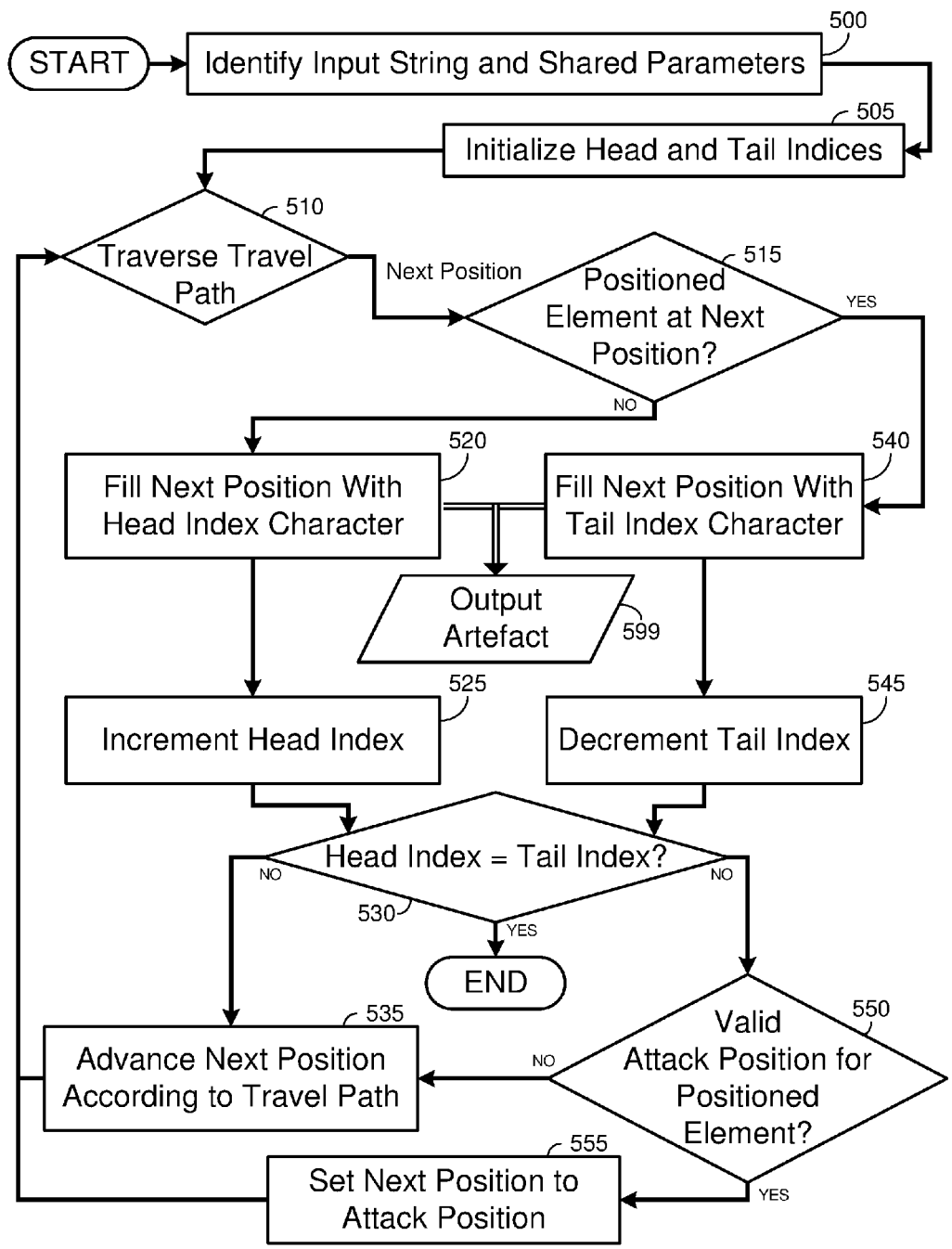
FIG. 5 is a flowchart diagram for a low-resource encoding program, in accordance with at least one embodiment of the present invention.

Referring now to FIG. 5, FIG. 5 is a flowchart diagram for a low-resource decoding program 101, in accordance with at least one embodiment of the invention. At step 500, the low-resource encoding program identifies the input string 200 and the set of shared parameters 210. At step 505, the low-resource encoding program 101 may initialize the head index 202 to the first character of the one or more ordered characters 204, and the low-resource encoding program 101 may further initialize the tail index 206 to the last character of the one or more ordered characters 204.

Referring still to the flowchart diagram of FIG. 5, at decision block 510, the low-resource encoding program 101 traverses the travel path 216 to yield the output artefact 230 by processing the other steps in a loop, for each next position of the plurality of spatially related positions 214, and beginning with the initial position 218. The next position may be understood as that of the spatially related positions 214 that the low-resource encoding program 101 is processing in the current iteration. The processing loop of decision block 510 may be understood as starting with the initial position 218 in the travel path 216, but it is not assumed that the entire travel path 216 will be traversed in order, that all positions 214 will be visited, or that, in some embodiments, any given position 214 will not be traversed multiple times. Specifically, the actual order of traversing the positions 214 depends not only on the travel path 216, but also on the attack positions 224, as described below.

The output artefact 230 may be instantiated, created, or generated, pursuant to decision block 510, or in advance. The output artefact 230 may be understood to include the coding frame instance 232 with fillable positions 234. The low-resource encoding program may fill the fillable positions 234 as it iterates over decision block 510, with the coding frame instance 232 being taken as complete upon the low-resource encoding program 101 terminating, as described below.

The low-resource encoding program proceeds, for the next position, at decision block 515 by determining whether the next position includes the location position 222 for any active element of the one or more positioned elements 220. The active element may be understood as that of the positioned elements 220 (i.e., chess pieces 410) that is present in the next position. In some embodiments, the positioned elements 220 may be restricted so that only one positioned element 220 (the active element) may be present in a given position 214 (the next position); this restriction is equivalent to standard chess, wherein only one piece may occupy a square at a time. In other embodiments, however, this restriction need not necessarily apply, and the invention may be practiced so as to take account of multiple positioned elements 220 present in the same position 214.

Responsive to no active element having its location position 222 at the next position (decision block 515, NO branch), the low-resource encoding program 101 proceeds at step 520 by filling the next position in the output artefact 230 (i.e., that of the fillable positions 234 that corresponds to the next position) with that of the one or more ordered characters 204 that is identified by the head index 202. In FIG. 5, the output artefact 599 is represented as receiving the filling data from step 520. The low-resource encoding program 101 may proceed at step 525 by incrementing the head index 202 forward by one character of the one or more ordered characters 204.

At decision block 530, the low-resource encoding program 101 compares the head index 202 with the tail index 206. Responsive to the head index 202 being equal to the tail index 206, the low-resource encoding program 101 terminates (decision block 530, YES branch). If the head index 202 is equal to the tail index 206, then it may be understood that the entire input string 200 has been encoded into the output artefact 230, and the output artefact 230 may be understood to include an encoding of the input string 200. More broadly, the head index 202 equaling the tail index 206 may be taken as all characters 204 having been processed, by any means of iteration or simultaneous consideration. At step 535 (decision block 530, left NO branch, having come from the left at step 525), the low-resource encoding program 101 may advance the next position according to the travel path 216 and returning to process the new next position at decision block 510.

Referring now to decision block 515, the low-resource encoding program 101 may determine whether the next position includes the location position 222 for any active element of the one or more positioned elements 220. Responsive to the active element having its location position 222 at the next position (decision block 515, YES branch) the low-resource encoding program 101 proceeds at step 540 by filling the next position in the output artefact 230 (i.e., that of the fillable positions 234 that corresponds to the next position) with that of the one or more ordered characters 204 that is identified by the tail index 206. Thus, in at least some embodiments, by pulling characters from the input string 200 out of order (from the front or the back, depending on the chess pieces 410), rather than by directly substituting characters 204 for other characters, the low-resource encoding program 101 achieves a cipher that is both reasonably robust and does not require the processor-intensive arithmetic needed for cryptography. Referring back to FIG. 5, the output artefact 599 is represented as receiving the filling data from step 540. The low-resource encoding program 101 may proceed at step 545 by decrementing the tail index 206 backward by one character of the one or more ordered characters 204.

Referring still to the flowchart diagram of FIG. 5, at decision block 530, the low-resource encoding program 101 compares the head index 202 with the tail index 206. Responsive to the head index 202 being equal to the tail index 206, the low-resource encoding program 101 terminates (decision block 530, YES branch). As above, the head index 202 equaling the tail index 206 may be understood to mean that the encoding algorithm has completed. At decision block 550 (decision block 530, right NO branch, having come from the right at step 545), the low-resource encoding program 101 may determine, for the active element, an active attack position by selecting from the one or more attack positions 224, based on the specified order of the attack positions 224 and on whether each of the one or more attack positions 224 is valid. The active attack position refers to that of the attack positions 224 that the low-resource encoding program selects. The selection step may be achieved by iterating over or traversing the attack positions 224 in order of preference, until a valid attack position 224 is found.

In some embodiments, valid attack positions are restricted to those positions 214 that have not already been filled in the coding frame instance 232. Additionally, validity, in the context of attack positions 224 may include that the attack position is allowed, according to predetermined rules (e.g., of chess, of some other game, or of arbitrary construction). These predetermined rules, unlike the predetermined attack positions 224 themselves, generally take into account the positions and properties of other positioned elements 220, while the attack positions 224 define the properties of the positioned element in relation to the space in which it is positioned (i.e., the coding frame 212). In some embodiments, the predetermined rules may be the rules of a variant of chess, including standard chess. Thus, according to the rules of standard chess, examples of invalid moves include: (i) chess pieces 410 attacking off the board 400; (ii) chess pieces 410 attacking into a square occupied by a piece of the same color; (iii) chess pieces other than knights attacking through other pieces; and (iv) chess pieces 410 attacking such that the king of the same color is placed in check.

Referring still to the flowchart diagram of FIG. 5, responsive to the active attack position existing for the active element (decision block 550, YES branch; i.e., a valid attack was selected from the attack positions 224), at step 555, the low-resource encoding program 101 sets the next position to the active attack position, and the low-resource encoding program 101 proceeds to decision block 510 to process the now-shifted next position. For various embodiments, the shifting of the next position in response to encountering the active element introduces an additional layer of reasonably robust encoding to the cipher that, like taking from the end of the input string 200, also does not require processor-intensive arithmetic as is the case for cryptography. Referring now back to FIG. 5, responsive to no active attack position existing for the active element (decision block 550, NO branch), the low-resource encoding program 101 may, at step 535, advance the next position according to the travel path 216 and proceed with processing the next position at decision block 510.

Figure 6:
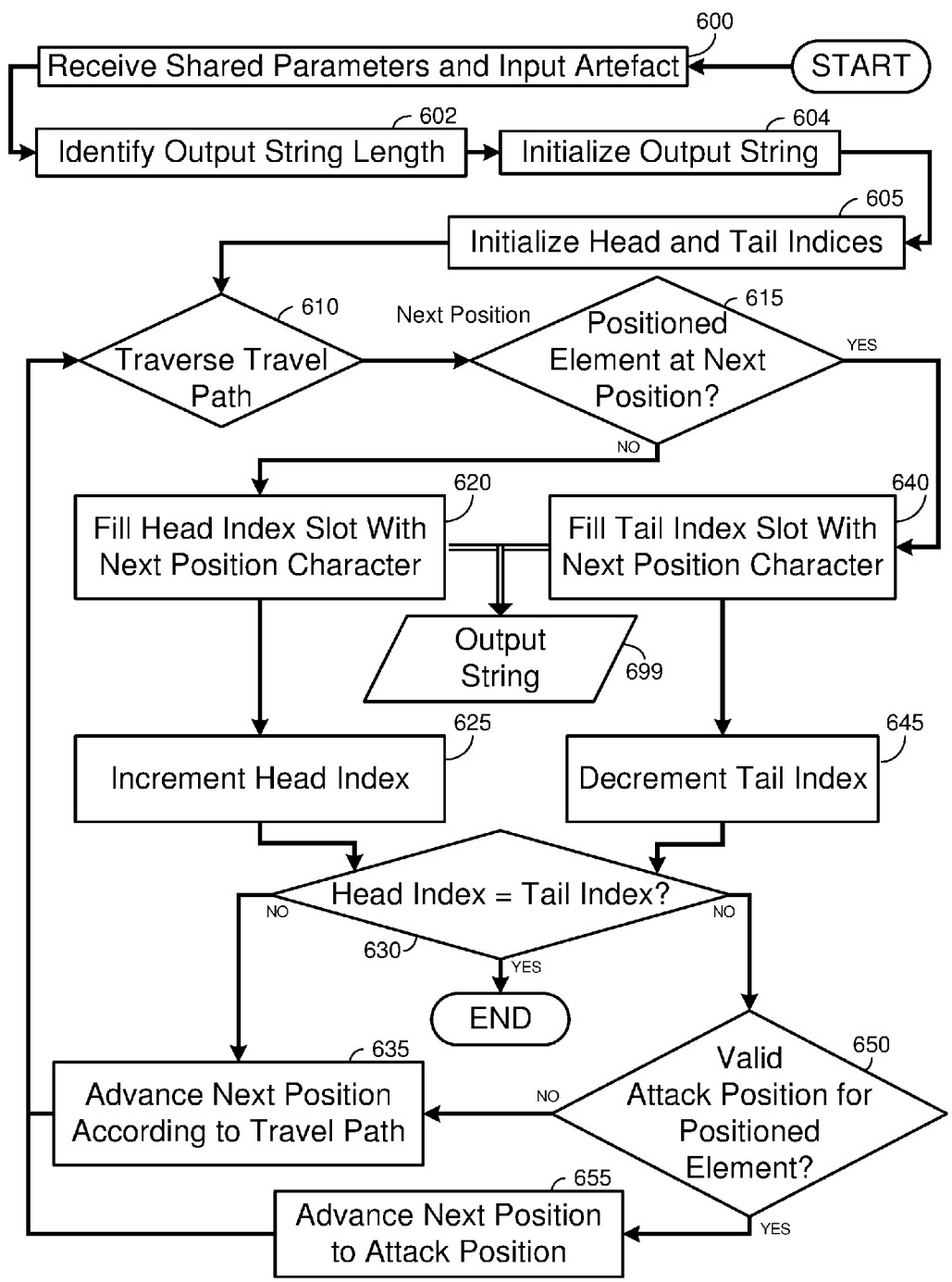
FIG. 6 is a flowchart diagram for a decoding program, in accordance with at least one embodiment of the present invention.

Referring now to FIG. 6, FIG. 6 displays a flowchart diagram for the decoding program 107, in accordance with at least one embodiment of the present invention. Except where differences are discussed in detail, the decoding program 107 may be understood to proceed similarly to the low-resource encoding program 101. At step 600, the decoding program 107 receives the shared parameters 310. Also at step 600, the decoding program 107 receives the input artefact 330. At step 602, the decoding program 107 identifies the output string length 336. As stated above, the output string length may be received or predetermined. At step 604, the decoding program initializes the output string 300. At step 605, the decoding program 107 may initialize the head index 302 to the first slot of the plurality of slots 304, and the decoding program 107 may further initialize the tail index 306 to the last slot of the plurality of slots 304.

At decision block 610, the decoding program 107 traverses the travel path 316 to for the input artefact 330 by processing the other steps in a loop, for each next position of the plurality of spatially related positions 314, and beginning with the initial position 318. The decoding program 107 proceeds, for the next position, at decision block 615 by determining whether the next position includes the location position 322 for any active element of the one or more positioned elements 320. Responsive to no active element having its location position 322 at the next position (decision block 615, NO branch), the decoding program 107 proceeds at step 620 by filling that slot of the plurality of ordered empty slots 304 that is identified by the head index 302 with the content character from the next position. In FIG. 6, the output string 699 is represented as receiving the filling data from step 620. The decoding program 107 may proceed at step 625 by incrementing the head index 302 forward by one slot of the one or more ordered slots 304.

At decision block 630, the decoding program 107 compares the head index 302 with the tail index 306. Responsive to the head index 302 being equal to the tail index 306, the decoding program 107 terminates (decision block 630, YES branch). If the head index 302 is equal to the tail index 306, then it may be understood that the entire input artefact 330 has been decoded into the output string 300, and the output string 300 may be understood to include a decoding of the input artefact 330. More broadly, the head index 302 equaling the tail index 306 may be taken as all slots 304 having been processed, by any means of iteration or simultaneous consideration. At step 635 (decision block 630, left NO branch, having come from the left at step 625), the decoding program 107 may advance the next position according to the travel path 316 and returning to process the new next position at decision block 610.

Referring now to decision block 615, the decoding program 107 may determine whether the next position includes the location position 322 for any active element of the one or more positioned elements 320. Responsive to the active element having its location position 222 at the next position (decision block 615, YES branch) the decoding program 107 proceeds at step 640 by filling that slot of the plurality of ordered empty slots 304 that is identified by the tail index 306 with the content character from the next position. The output string 699 is represented as receiving the filling data from step 640. The decoding program 107 may proceed at step 645 by decrementing the tail index 306 backward by one slot of the plurality of ordered slots 304.

Referring still to the flowchart diagram of FIG. 6, at decision block 630, the decoding program 107 compares the head index 302 with the tail index 306. Responsive to the head index 302 being equal to the tail index 306, the decoding program 107 terminates (decision block 630, YES branch). As above, the head index 302 equaling the tail index 306 may be understood to mean that the decoding algorithm has completed. At decision block 650 (decision block 630, right NO branch, having come from the right at step 645), the decoding program 107 may determine, for the active element, an active attack position by selecting from the one or more attack positions 324, based on the specified order of the attack positions 324 and on whether each of the one or more attack positions 324 is valid. The active attack position refers to that of the attack positions 324 that the decoding program selects. The selection step may be achieved by iterating over or traversing the attack positions 324 in order of preference, until a valid attack position 324 is found. In some embodiments, valid attack positions 224 for the decoding program 107 are restricted to those positions 314 that not have not already been processed from the coding frame instance 332 into the output string 300. This is equivalent to, in the context of the low-resource encoding program 101, excluding positions 214 that have already been filled. In addition, validity may depend upon predetermined rules in the manner described above for the low-resource encoding program 101.

Referring still to the flowchart diagram of FIG. 6, responsive to the active attack position existing for the active element (decision block 650, YES branch; i.e., a valid attack was selected from the attack positions 324), the decoding program 107 sets the next position to the active attack position, and the decoding program 107 proceeds to decision block 610 to process the now-shifted next position. Referring now back to decision block 650, responsive to no active attack position existing for the active element (decision block 650, NO branch), the decoding program 107 may, at step 635, advance the next position according to the travel path 316 and proceed with processing the next position at decision block 610.

In various embodiments of the low-resource encoding program 101, the shared parameters 210 may be configured to change based on the positioned elements 220. Specifically, the low-resource encoding program 101 and decoding program 107 may evolve at least one of the one or more attack positions 224 and the specified order for the attack positions 224, based on at least one of the next positions and that of the one or more ordered characters that is identified by the tail index 206. Thus, the low-resource encoding program causes shifts in or evolves the shared parameters in response to an active element being present at the next position, but chooses how to evolve the shared parameters based on the content. The decoding program 107 may evolve the shared parameters 310 correspondingly to retrieve the encoded data. In such embodiments, the low-resource encoding program 101 may effectively increase the expected unpredictability of the encoded data without processor-intensive arithmetic, and in a way that incorporates both the shared parameters themselves (the positioned elements 220) and the input string 200. In further embodiments, the shared parameters 310 may evolve based on any of the shared parameters 210, the head index 202, other properties of the input string 200, etc.

In various embodiments, the low-resource encoding program may append an additional data to the input string 200. Correspondingly, the decoding program 107 may decode the additional data from the input artefact 330. At a minimum, the additional data further obfuscates the original data and increases the robustness of the encoding at low cost. To this end, the additional data may include random data. In other embodiments, the low-resource encoding program 101 may generate a checksum for the input string 200 without the additional data and append the checksum as the additional data. The decoding program 107 may then check its results for errors using the checksum. In other embodiments, the low-resource encoding program 101 may include a code word as the additional data and evolve the set of shared parameters, based on the code word. For example, the low-resource encoding program may append the code word "first" to a given input string 200, and then for the next input string 200 reflect the positioned elements 320 about the coding frame 312 or move the initial position 318. The decoding program 107, responsive to decoding the code word "first", may make corresponding changes to the shared parameters 310 for the next input artefact 330. Any of the shared parameters 210 may be evolved in this manner over multiple iterations of the methods described, thus increasing the robustness of the encoding.

Figure 7:
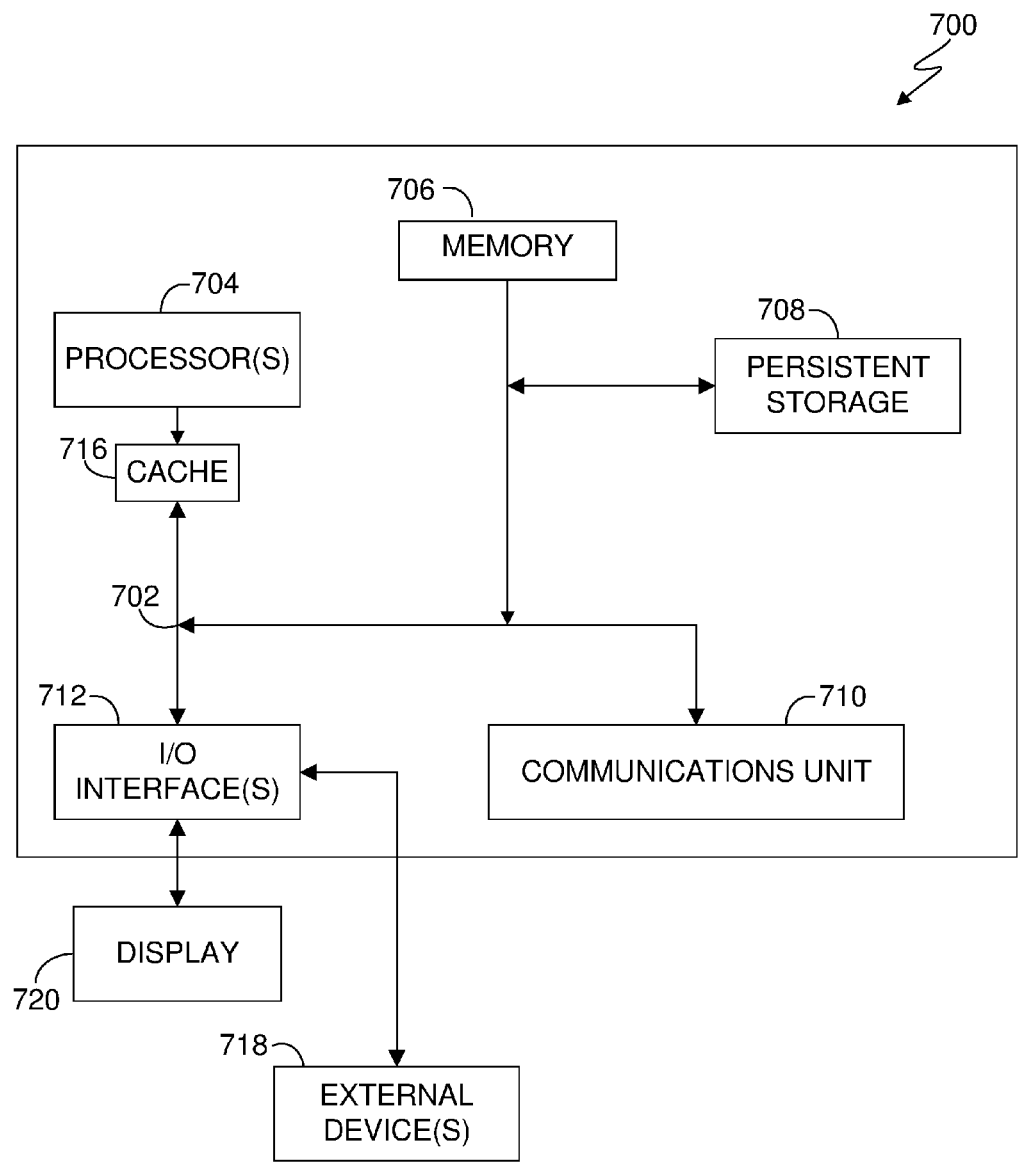
FIG. 7 is a block diagram depicting various logical elements for a computer system capable of executing program instructions, in accordance with at least one embodiment of the present invention.

FIG. 7 is a block diagram depicting components of a computer 700 suitable for executing the low-resource encoding program 101 and/or the decoding program 107. FIG. 7 displays the computer 700, the one or more processor(s) 704 (including one or more computer processors), the communications fabric 702, the memory 706, the RAM, the cache 716, the persistent storage 708, the communications unit 710, the I/O interfaces 712, the display 720, and the external devices 718. It should be appreciated that FIG. 7 provides only an illustration of one embodiment and does not imply any limitations with regard to the environments in which different embodiments may be implemented. Many modifications to the depicted environment may be made.

As depicted, the computer 700 operates over a communications fabric 702, which provides communications between the cache 716, the computer processor(s) 704, the memory 706, the persistent storage 708, the communications unit 710, and the input/output (I/O) interface(s) 712. The communications fabric 702 may be implemented with any architecture suitable for passing data and/or control information between the processors 704 (e.g., microprocessors, communications processors, and network processors, etc.), the memory 706, the external devices 718, and any other hardware components within a system. For example, the communications fabric 702 may be implemented with one or more buses or a crossbar switch.

The memory 706 and persistent storage 708 are computer readable storage media. In the depicted embodiment, the memory 706 includes a random access memory (RAM). In general, the memory 706 may include any suitable volatile or non-volatile implementations of one or more computer readable storage media. The cache 716 is a fast memory that enhances the performance of computer processor(s) 704 by holding recently accessed data, and data near accessed data, from memory 706.

Program instructions for the low-resource encoding program 101 and/or the decoding program 107 may be stored in the persistent storage 708 or in memory 706, or more generally, any computer readable storage media, for execution by one or more of the respective computer processors 704 via the cache 716. The persistent storage 708 may include a magnetic hard disk drive. Alternatively, or in addition to a magnetic hard disk drive, the persistent storage 708 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of the persistent storage 708.

The communications unit 710, in these examples, provides for communications with other data processing systems or devices. In these examples, the communications unit 710 may include one or more network interface cards. The communications unit 710 may provide communications through the use of either or both physical and wireless communications links. The low-resource encoding program 101 and/or the decoding program 107 may be downloaded to the persistent storage 708 through the communications unit 710. In the context of some embodiments of the present invention, the source of the various input data may be physically remote to the computer 700 such that the input data may be received and the output similarly transmitted via the communications unit 710.

The I/O interface(s) 712 allows for input and output of data with other devices that may operate in conjunction with the computer 700. For example, the I/O interface 712 may provide a connection to the external devices 718, which may include a keyboard, keypad, a touch screen, and/or some other suitable input devices. External devices 718 may also include portable computer readable storage media, for example, thumb drives, portable optical or magnetic disks, and memory cards. Software and data used to practice embodiments of the present invention may be stored on such portable computer readable storage media and may be loaded onto the persistent storage 708 via the I/O interface(s) 712. The I/O interface(s) 712 may similarly connect to a display 720. The display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
identifying an input string, said input string comprising one or more ordered characters;
identifying a set of shared parameters, said set of shared parameters comprising:
  a coding frame, said coding frame comprising a plurality of spatially related positions;
  each of said plurality of spatially related positions being fillable by any of said one or more ordered characters;
  one or more positioned elements, each of said one or more positioned elements having defined therefor a location position and one or more attack positions, said location position and each of said one or more attack positions being of said plurality of spatially related positions, said one or more attack positions being in a specified order;
  a travel path, said travel path comprising an order for traversing said plurality of spatially related positions; and
  an initial position, said initial position being that of said plurality of spatially related positions that is first in said travel path;
initializing a head index to a first character of said one or more ordered characters;
initializing a tail index to a last character of said one or more ordered characters;
traversing said travel path to yield an output artefact by, for each next position of said plurality of spatially related positions, beginning with said initial position:
  determining whether said next position comprises said location position for any active element of said one or more positioned elements; and
  responsive to no active element having said location position at said next position:
    filling said next position in said output artefact with that of said one or more ordered characters that is identified by said head index;
    incrementing said head index forward by one character of said one or more ordered characters;
    responsive to said head index being equal to said tail index, terminating; and advancing said next position according to said travel path;
responsive to said active element having said location position at said next position:
filling said next position in said output artefact with that of said one or more ordered characters that is identified by said tail index;
decrementing said tail index backward by one character of said one or more ordered characters;
responsive to said head index being equal to said tail index, terminating;
determining, for said active element, an active attack position by selecting from said one or more attack positions, based on said specified order and on whether each of said one or more attack positions is valid;
responsive to said active attack position existing for said active element, setting said next position to said active attack position; and
responsive to no active attack position existing for said active element, advancing said next position according to said travel path;
whereby said output artefact comprises an encoding of said input string.

2. The computer-implemented method of claim 1, further comprising transmitting said output artefact to a recipient.

3. The computer-implemented method of claim 1, wherein said coding frame comprises a planar grid, said grid being eight positions by eight positions in size.

4. The computer-implemented method of claim 3, wherein said one or more positioned elements and said one or more attack positions are defined in accordance with a variant of chess.

5. The computer-implemented method of claim 1, further comprising evolving at least one of said one or more attack positions and said specified order, based on at least one of said next position and that of said one or more ordered characters that is identified by said tail index.

6. The computer-implemented method of claim 1, further comprising appending an additional data to said input string.

7. The computer-implemented method of claim 6:
wherein said additional data comprises a code word; and
further comprising evolving said set of shared parameters based on said code word.

8. The computer-implemented method of claim 6, wherein said additional data comprises a checksum having been generated based on said input string without said additional data.

9. The computer-implemented method of claim 6, wherein said additional data comprises random data.

10. A computer-implemented method, comprising:
receiving a set of shared parameters, said set of shared parameters comprising:
a coding frame, said coding frame comprising a plurality of spatially related positions;
each of said plurality of spatially related positions being fillable by a content character selected from of a set of characters;
one or more positioned elements, each of said one or more positioned elements having defined therefor a location position and one or more attack positions, said location position and each of said one or more attack positions being of said plurality of spatially related positions, said one or more attack positions being in a specified order;
a travel path, said travel path comprising an order for traversing said plurality of spatially related positions; and
an initial position, said initial position being that of said plurality of spatially related positions that is first in said travel path;
receiving an input artefact, said input artefact comprising an instance of said coding frame wherein at least one of said plurality of spatially related positions is filled by said content character;
identifying an output string length;
initializing an output string, said output string comprising a plurality of ordered empty slots, said plurality of ordered empty slots being equal in number to said output string length;
initializing a head index to a first slot of said plurality of ordered empty slots;
initializing a tail index to a last slot of said plurality of ordered empty slots;
for said input artefact, traversing said travel path by, for each next position of said plurality of spatially related positions, beginning with said initial position:
determining whether said next position comprises said location position for any active element of said one or more positioned elements;
responsive to no active element having said location position at said next position:
filling that slot of said plurality of ordered empty slots that is identified by said head index with said content character from said next position;
incrementing said head index forward by one slot of said plurality of ordered empty slots;
responsive to said head index being equal to said tail index, terminating; and
advancing said next position according to said travel path;
responsive to said active element having said location position at said next position:
filling that slot of said plurality of ordered empty slots that is identified by said tail index with said content character from said next position;
decrementing said tail index backward by one slot of said plurality of ordered empty slots;
responsive to said head index being equal to said tail index, terminating;
determining, for said active element, an active attack position by selecting from said one or more attack positions, based on said specified order and on whether each of said one or more attack positions is valid;
responsive to said active attack position existing for said active element, setting said next position to said active attack position; and
responsive to no active attack position existing for said active element, advancing said next position according to said travel path;
whereby said output string comprises a decoding of said input artefact.

11. The computer-implemented method of claim 10, wherein said coding frame comprises a planar grid, said grid being eight positions by eight positions in size.

12. The computer-implemented method of claim 11, wherein said one or more positioned elements and said one or more attack positions are defined in accordance with a variant of chess.

13. The computer-implemented method of claim 10, further comprising evolving at least one of said one or more attack positions and said specified order, based on at least one of said next position and that of said one or more ordered characters that is identified by said tail index.

14. The computer-implemented method of claim 10, further comprising decoding an additional data from said input artefact.

15. The computer-implemented method of claim 14:
wherein said additional data comprises a code word; and
further comprising evolving said set of shared parameters based on said code word.

16. The computer-implemented method of claim 14, wherein said additional data comprises a checksum for said output string without said additional data.

17. The computer-implemented method of claim 15, wherein said additional data comprises random data.

18. A computer program product comprising one or more computer readable storage media and program instructions stored on said one or more computer readable storage media, said program instructions comprising instructions to:
    identify an input string, said input string comprising one or more ordered characters;
    identify a set of shared parameters, said set of shared parameters comprising:
        a coding frame, said coding frame comprising a plurality of spatially related positions;
        each of said plurality of spatially related positions being fillable by any of said one or more ordered characters;
        one or more positioned elements, each of said one or more positioned elements having defined therefor a location position and one or more attack positions, said location position and each of said one or more attack positions being of said plurality of spatially related positions, said one or more attack positions being in a specified order;
        a travel path, said travel path comprising an order for traversing said plurality of spatially related positions; and
        an initial position, said initial position being that of said plurality of spatially related positions that is first in said travel path;
    initialize a head index to a first character of said one or more ordered characters;
    initialize a tail index to a last character of said one or more ordered characters; and
    traverse said travel path to yield an output artefact by, for each next position of said plurality of spatially related positions, beginning with said initial position:
        determining whether said next position comprises said location position for any active element of said one or more positioned elements;
        responsive to no active element having said location position at said next position:
            filling said next position in said output artefact with that of said one or more ordered characters that is identified by said head index;
            incrementing said head index forward by one character of said one or more ordered characters;
            responsive to said head index being equal to said tail index, terminating; and
            advancing said next position according to said travel path;
        responsive to said active element having said location position at said next position:
            filling said next position in said output artefact with that of said one or more ordered characters that is identified by said tail index;
            decrementing said tail index backward by one character of said one or more ordered characters;
            responsive to said head index being equal to said tail index, terminating;
            determining, for said active element, an active attack position by selecting from said one or more attack positions, based on said specified order and on whether each of said one or more attack positions is valid;
            responsive to said active attack position existing for said active element, setting said next position to said active attack position; and
            responsive to no active attack position existing for said active element, advancing said next position according to said travel path;
    whereby said output artefact comprises an encoding of said input string.

19. The computer program product of claim 18, wherein said program instructions further comprise instructions to:
    append a code word to said input string; and
    evolve said set of shared parameters based on said code word.

20. The computer program product of claim 18, wherein said program instructions further comprise instructions to:
    append a checksum to said input string, said checksum having been generated based on said input string without said checksum.

* * * * *